United States Patent [19]

Mori et al.

[11] Patent Number: 5,168,379
[45] Date of Patent: Dec. 1, 1992

[54] SOLID STATE IMAGING DEVICE HAVING A DEFECT RELIEF SYSTEM

[75] Inventors: Yasuo Mori; Shigeki Nishizawa; Iwao Takemoto, all of Mobara, Japan

[73] Assignee: Hitachi, Ltd., Tokyo, Japan

[21] Appl. No.: 646,381

[22] Filed: Jan. 28, 1991

[30] Foreign Application Priority Data

Jan. 30, 1990 [JP] Japan ................. 2-20142

[51] Int. Cl.⁵ ............ H04N 3/14; H04N 5/335; G11C 7/00
[52] U.S. Cl. ............ 358/213.17; 358/213.11; 365/200
[58] Field of Search ........ 358/213.17, 213.11, 358/213.15; 250/492.1; 365/183, 200, 115

[56] References Cited

U.S. PATENT DOCUMENTS

| | | | |
|---|---|---|---|
| 4,189,751 | 2/1980 | Nagumo | 358/213.17 |
| 4,233,671 | 11/1980 | Gerzberg et al. | 365/115 |
| 4,589,028 | 5/1986 | Ochi | 358/213.17 |
| 4,608,668 | 8/1986 | Ohno et al. | 365/200 |
| 4,837,520 | 6/1989 | Golke et al. | 365/200 |
| 4,839,864 | 6/1989 | Fujishima | 365/200 |
| 4,996,670 | 2/1991 | Ciraula et al. | 365/200 |

FOREIGN PATENT DOCUMENTS 60-51378  3/1985  Japan .

Primary Examiner—Michael Razavi
Assistant Examiner—Wendy R. Greening
Attorney, Agent, or Firm—Antonelli, Terry, Stout & Kraus

[57] ABSTRACT

A solid state imaging device composed of a plurality of photo-diodes each of which having a P-N junction. A P-N junction which corresponds to that of a faulty picture cell is destroyed through use of a high energy beam irradiation, such as a laser. Signal data corresponding to that of the destroyed picture cell is detected through use of a voltage comparator which outputs a signal indicative of either a preceding picture cell or that corresponding to a picture cell of a preceding row of picture cells. This system can be used for specific address information. In accordance with the imaging device the defective pixel (picture cell) information appearing in the output signal of the matrix array of photo-diodes, which is at a correspondingly different level from that of ordinary read signals, is detected by a voltage detection circuit and the relief of the defective pixels can be implemented through use of circuits which form the preceding pixel signal information or the pixel signal information corresponding to that of a preceding row. As to implementing the system in connection with a specific address information, the defective pixel signal can also be used as a specific mark representing the display position thereof.

11 Claims, 3 Drawing Sheets

SOLID STATE IMAGING DEVICE HAVING A DEFECT RELIEF SYSTEM

BACKGROUND OF THE INVENTION

1. Field of the Invention

This invention relates to a solid state imaging device and to an imaging apparatus using the same. Further, the present invention relates to a technique which is effective, for example, when utilized for defect relief technique of solid state imaging devices.

2. Description of the Prior Art

Japanese Patent Laid-Open No. 51378/1985, for example, can be cited as a prior art reference describing the defect relief technique of solid state imaging devices. As described in this reference, the level data of a video defect signal is stored in an external storage device by a signal output and signal correction is externally carried out on the basis of this data.

However, the defect relief technique described above needs an external storage device and a memory control circuit for effecting the write/read control. As a result there is an increase in the number of necessary components. Therefore, the reduction of the size and weight of the solid state imaging device is impeded and the increase in the production cost is unavoidable. Furthermore, in accordance with this defect relief technique, a pair of external storage devices storing therein the data which corresponds on one-to-one basis to each solid state imaging device must be shipped. Accordingly, the inspection at the time of shipment and the acceptance inspection on the customer side are extremely troublesome and, moreover, the management during the assembly process of an imaging apparatus gets complicated. For these reasons, this defect relief technique does not provide a practical solution for the defect relief.

SUMMARY OF THE INVENTION

It is therefore an object of the present invention to provide a solid state imaging device which has specific mark function inclusive of the defect relief function while restricting the increase in the chip size.

It is another object of the present invention to provide an imaging apparatus in which high quality defect relief is accomplished through a simple construction.

These and other objects and novel features of the present invention will become more apparent from the following description taken in conjunction with the accompanying drawings.

The outline of a typical invention among those disclosed in this application is briefly given as follows. A high energy beam such as a laser beam is irradiated to a photo-diode of a defective pixel (picture cell) or a pixel (picture cell) corresponding to a specific address so as to destroy its P-N junction and to output a signal having a different level from that of a normal read signal. Defect relief is made by utilizing the fault picture data appearing in this output signal or the specific address data, or these data are used as marks representing specific display positions.

According to the means described above, the relief of defective pixels becomes possible by providing a simple circuit outside a solid state imaging device, the circuit including a voltage detecting circuit and a circuit for forming a signal of the preceding pixel or of the pixel one line before. If such a pixel signal is used as a mark, a special display circuit can be simplified.

DESCRIPTION OF THE PREFERRED EMBODIMENTS

Figure 1:
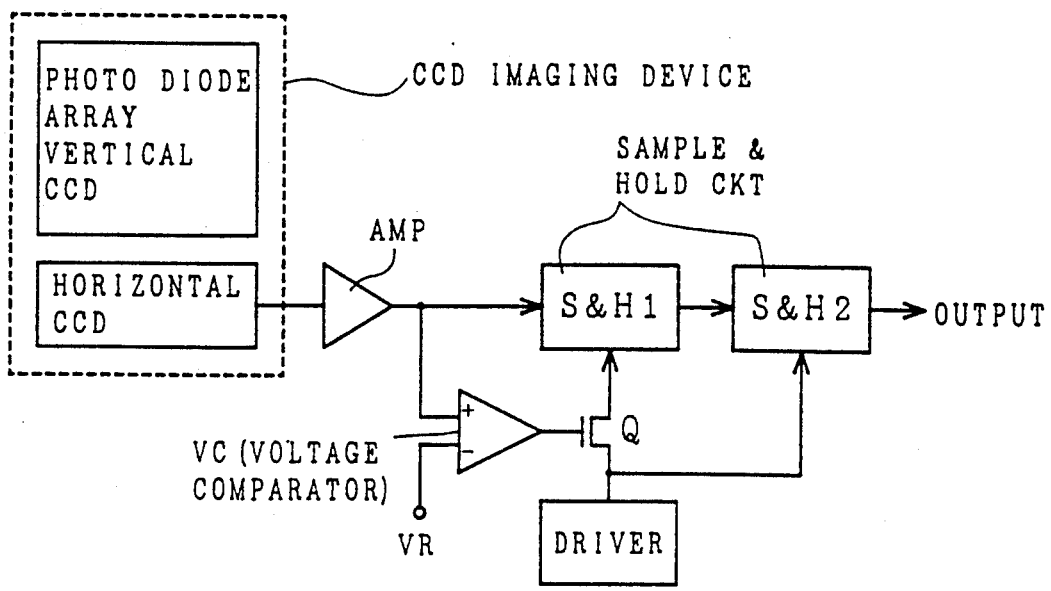
FIG. 1 is a block diagram showing a CCD solid state imaging device and an embodiment of an imaging apparatus using the same in accordance with the present invention.

FIG. 1 is a block diagram showing a solid state imaging device and an embodiment of an imaging apparatus using the imaging cell in accordance with the present invention.

The solid state imaging device in this embodiment is oriented to interline CCD solid state imaging devices, and an imaging array consists of photo-diodes and vertical CCDs (charge transfer devices). The signal charge stored here and transferred is outputted serially through a horizontal CCD which functions as a horizontal transfer shift register. This signal charge is once converted to a voltage signal by an internal output capacitor, is then amplified by a pre-amplifier and is thereafter outputted from output terminals. Since the detail of the internal structure of such an interline CCD solid state imaging device is the same as that of the prior art devices, its explanation will be omitted.

The output signal of the CCD solid state imaging device is amplified by an amplifier AMP and is supplied to a non-inverting input (+) of a comparator VC in order to detect a defective pixel signal which will be described later. A predetermined reference voltage VR whose signal level is lower than that of a normal pixel signal is supplied to the inverting input (−) of the comparator VC.

The output signal of the CCD solid state device described above is outputted through two sample-and-hold circuits S&H1 and S&H2 connected in series in order to relieve a defect signal. The sampling operation of these two sample-and-hold circuits S&H1, S&H2 is controlled by clock pulses supplied from a driver. The front stage sample-and-hold circuit S&H1 receives selectively the clock pulses described above through a switch device Q (such as an insulated gate field effect transistor) which is subjected to switching control by the output signal of the comparator VC.

The output signal outputted from the rear-stage sample-and-hold circuit S&H2 is transmitted to various signal processing circuits and correction circuits which constitute an imaging apparatus and which are not shown in the drawings. Composite video signals in accordance with the NTSC system or the like are generated. Needless to say, a driving circuit for generating the timings of various pulse signals such as clock pulses, field shift pulses, and the like, that are necessary for the operations of the CCD solid state imaging device described above is provided to the imaging apparatus.

The following defect relieving processing is carried out for such an interline CCD solid state imaging device.

Figure 2A:
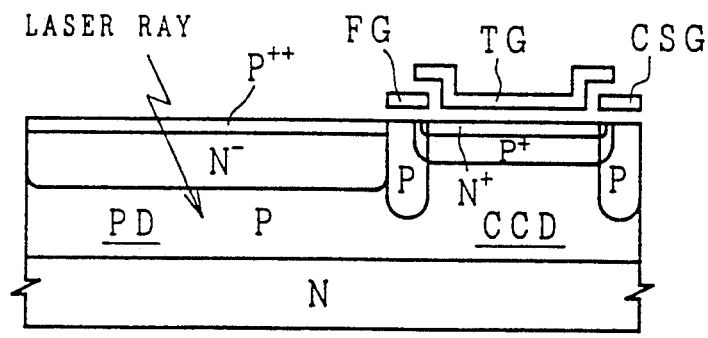
FIG. 2(A) is a schematic sectional view of the structure of the imaging device.
Figure 2B:
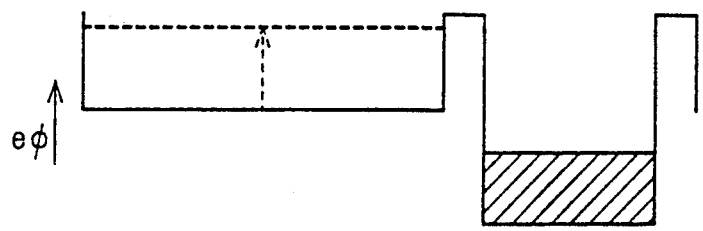
FIG. 2(B) is a potential distribution diagram corresponding to the view of FIG. 2(A)

FIG. 2(A) is a schematic sectional view of the structure of an embodiment of the pixel cell in the CCD solid state imaging device shown in FIG. 1, and FIG. 2(B) is its potential distribution diagram.

The CCD solid stage imaging device is formed on an N-type silicon substrate, though the arrangement is not particularly limited to this. A P-type well region is formed on this N-type substrate. Each photo-diode PD is constituted by this P-type well region and N$^-$ layer formed on the surface of the P-type well region. A P layer is formed below a PD transfer gate FG made of the first layer of polysilicon layers between the photo-diode PD and a CCD transfer path through a gate insulation film which is not shown in the drawings. A P$^{++}$ layer is formed on the entire surface of the photo-diodes PD, though the arrangement is not particularly limitated to this.

As to the CCD transfer path, a P$^+$ layer is formed on the surface of the P-type well region described above, and an N$^+$ layer constituting a CCD transfer channel is formed on the surface of this P$^+$ layer A P layer as a channel stopper is formed on the right side of the CCD transfer path.

A CCD transfer gate TG consisting of the third layer of the polysilicon layers and a CCD transfer gate, not shown, consisting of the second layers of the polysilicon layers are formed on the surface of the semiconductor substrate constituting the CCD transfer path described above through a gate insulation film. A channel stop gate CSG is formed on the surface of the P layer as the channel stopper described above.

In FIG. 2(B), when a positive voltage is supplied to the PD transfer gate FG described above, the P layer under the gate causes N-inversion, so that the potential level $e\phi$ ($e = -1.6 \times 10^{-19}$ coulomb) of the electrons becomes lower than that of the N$^-$ layer constituting the photo-diodes PD, and the signal charge generated by the photoelectric conversion of the photo-diode described above is read out to the CCD transfer path having the lowest electron potential level.

In this embodiment, a high energy beam such as a laser beam is irradiated to the pixel cell having defects so as to destroy its junction portion (N$^-$, P). Accordingly, the potential of a photo-diode PD in which a fault exists is fixed to the one equal to that of the P-type well region as shown by dotted line in the potential distribution diagram of FIG. 2(B).

Consequently, a signal having a remarkably different level (hereinafter referred to as a "defective pixel level") from that of the normal picture signal is outputted as the read signal from the photo-diode whose junction is destroyed, from the output terminal of the CCD solid state imaging device.

In the embodiment shown in FIG. 1, when the defective pixel level described above is detected, the comparator VC sets its output signal to the low level. Accordingly, the switch device is turned OFF and the sampling clock for taking the input signal is not supplied to the first sample-and-hold circuit S&H1. In other words, since this first sample-and-hold circuit S&H1 holds the signal taken just before, the second sample-and-hold circuit S&H2 samples again the same signal and outputs it in place of the defective pixel signal described above.

The defect relieving circuit described above employs a structure in which the defective pixel signal, such as described above, is recorded on the solid state imaging device itself and is outputted. Accordingly, high quality defect relief becomes possible by providing externally only simple circuits such as a comparator and sample-and-hold circuits for replacing the defective pixel signal. Since the defective pixel signals are recorded on the solid state imaging device itself, it is possible to eliminate the necessity of the shipment of a pair of external storage devices, into which the data corresponding on the one-to-one basis to each solid state imaging device is written by conventional defect relieving methods, and to eliminate the troublesome management in the assembly process of the imaging apparatus. Inspection at the time of shipment of the solid state imaging device and inspection for acceptance on the customer side can be simplified, too.

Figure 3:
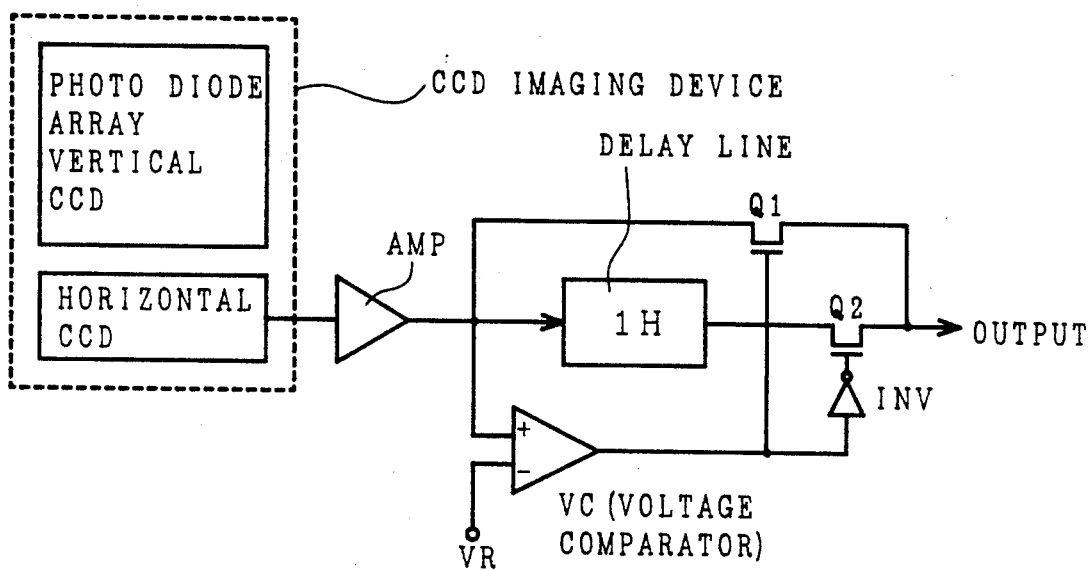
FIG. 3 is a block diagram showing a CCD solid state imaging device according to the present invention and another embodiment of an imaging apparatus using the same.

FIG. 3 is a block diagram showing another embodiment of the imaging apparatus using the solid state imaging device in accordance with the present invention.

This embodiment uses the picture signal of one preceding row as the defective pixel signal. In other words, a 1H delay line is disposed at the output of the amplifier AMP for receiving the output signal from the CCD solid state imaging device which is similar to the one described above in order to generate a signal delayed by 1H (one horizontal scanning period). The output of the amplifier AMP and the output signal of the 1H delay line are outputted selectively through analog switch devices Q1 and Q2 each consisting of a MOSFET. The output signal of the comparator VC, similar to the one described above, is supplied to the control terminal (gate) of the switch device Q1 and the output signal of the comparator VC is supplied to the control terminal of the switch device Q2 after it is inverted through the inverter circuit INV.

According to this structure, when the read signal is outputted from the defective pixel cell having the P-N junction destroyed at its photo-diode portion by the laser beam or the like, the output signal of the comparator VC falls to the low level. Accordingly, the switch device Q1 is turned OFF and inhibits the output of the defective pixel signal which is outputted through the amplifier AMP. The output signal of the inverter circuit INV changes to the high level in response to the low level of the output signal of the comparator VC and the switch device Q is turned ON. Accordingly, the picture signal of one preceding row outputted through the 1H delay line is outputted at the output in place of the fault picture signal.

Figure 4:
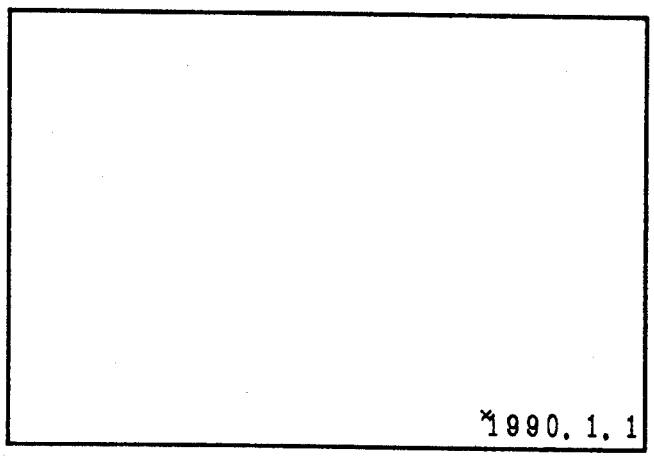
FIG. 4 is a structural view of a screen illustrating an example of the application of the CCD solid state imaging device in accordance with the present invention.

FIG. 4 is a structural view of a screen for explaining a method used when a mark is recorded at a specific address of the solid state imaging device described above.

In VTRs equipped integrally with a camera, or the like, the function of recording the photographing date is added. When the date is recorded by numeric figures at the right lower portion of the screen as shown in FIG. 4, for example, the address signals for the insertion of characters can be generated by counting the clock pulses supplied to the solid state imaging device. According to this construction, a counter circuit for counting the clock pulses, described above, and a decoder circuit become necessary.

In this embodiment, the P-N junction of the photo-diode is destroyed as indicated by mark X for the leading address where the characters are inserted. Its read signal is detected by the comparator such as the one described before, changed over to the preceding pixel or to the pixel one row before and is then outputted. At the same time, the characters are inserted with its output timing being the reference. According to this construction, the counter for a plurality of lines and for detecting the positions of dots arranged in the vertical direction and constituting the characters can be of a simple structure of about 4-bit unit. If the mark described above is inserted while aligned in one longitudinal line for inserting the characters, the counter circuit for searching out the start point of the horizontal positions of the characters can be omitted.

Since the video signal is destroyed for the purpose of inserting the characters, such character insertion positions may be replaced by signals having a black level or a predetermined inconspicuous level instead of outputting the picture signal of the preceding row or the preceding pixel signal.

The mark described above may be utilized for generating the timing signals for special photographing besides the insertion of characters. The signals which are generated by destroying intentionally the junction portion of the photo-diode can also be utilized as various fixed marks besides the defect relief. In order to distinguish the defective pixel signal from the mark inside the same solid state imaging device, the mark may be formed by destroying a plurality of pixel cells.

Figure 5:
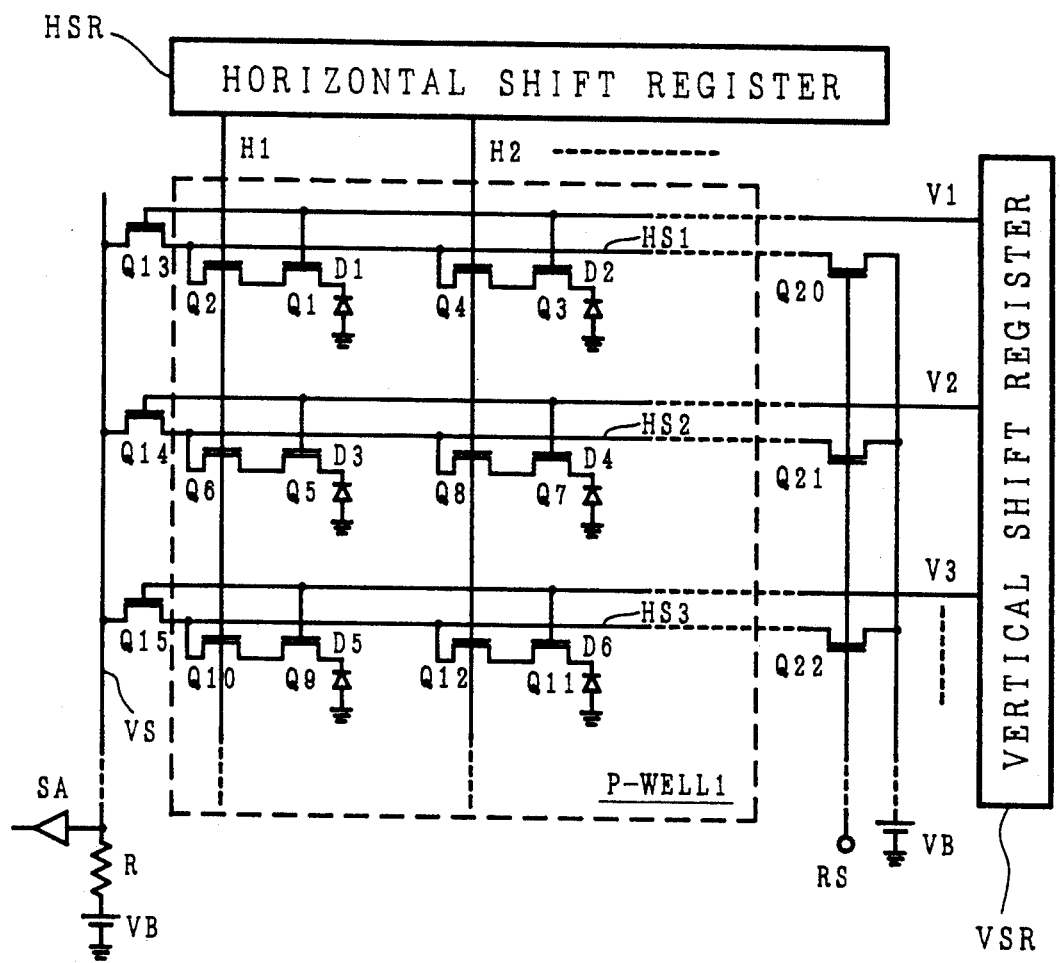
FIG. 5 is a circuit diagram of the essential part of an embodiment of a MOS solid state imaging device in accordance with the present invention.

FIG. 5 is a circuit diagram of the principal portions of another embodiment of the solid state imaging device in accordance with the present invention. The solid state imaging device in this embodiment is directed to the MOS solid state imaging device. In the drawings, a three-row two-column circuit is shown typically by way of example. Though the circuit symbols given to switch MOSFETs in this embodiment overlap partially with those given to the switch devices of the embodiment shown in FIGS. 1 or 3, it is to be understood that they represent different members, respectively.

One pixel cell is a series circuit comprising a photo-diode D1 a switch MOSFET Q1 whose gate is connected to a vertical scanning line and a switch MOSFET Q2 whose gate is connected to a horizontal scanning line. The output nodes of other pixel cells (D2, Q3, Q4, etc) disposed in the same row (horizontal direction) where the pixel cell consisting of the photo-diode D1 and the switch MOSFETs Q1, Q2 is provided are connected to the signal line HS1 which is extended in the transverse direction in the drawing. The pixel cells of other row, similar to the one described above, are connected similarly. The vertical scanning line V1 corresponding to the signal lines HS1, and the like, is disposed in parallel with them. The switch MOSFETs Q1, Q3, etc, of the pixel cells corresponding to this vertical scanning line V1 are connected to the vertical scanning line V1, respectively. This also holds true of the vertical scanning lines V2 and V3 of other rows that are illustrated by way of example.

The horizontal scanning line is extended in the longitudinal direction in the drawing and the gates of the switch MOSFETs Q2, Q6 and Q10 that are arranged in the same column are connected to the common horizontal scanning line H1. The pixel cells arranged in other columns are connected to the corresponding scanning lines H2, etc, in the same way as described above. The circuit devices and the wiring described above constitute the pixel array.

The vertical scanning lines V1, V2 and V3 are also connected to the gates of the read switch MOSFETs Q13~Q15 for connecting the signal lines HS1~HS3, described above, to the output line VS which extends in the longitudinal (vertical) direction. A load resistor R for reading is disposed between this output line VS and a bias voltage VB. When a pixel cell is selected through this load resistor R, a current flows corresponding to the optical signal stored in the photo-diode, so that the read operation from that picture cell and the reset (pre-charge) operation for the next read operation are carried out simultaneously. The voltage signal obtained from the load resistor R is amplified by a sense amplifier SA and is outputted through an output circuit which is not shown in the drawings.

In the pixel array described above, the semiconductor regions such as the drain of the switch MOSFETs connected to the signals lines HS1~HS3 sometimes have photo-sensitivity and the false signal (smear, blooming) formed by these parasitic photo-diodes, etc, is stored in the signal line which is brought into a floating state at the time of non-selection.

In order to remove the false signal such as smear, blooming, etc, described above, in this embodiment reset MOSFETs Q20~Q22 are connected to the signal lines HS1~HS3 of each row, though this arrangement is not particularly limited to this. These MOSFETs Q20~Q22 are turned ON by the reset signal RS generated during the horizontal flyback time and supply the bias voltage VB to each signal line HS1~HS3. In order to reduce the influences of the false signal described above, the pixel array is formed in one well region P-WELL 1. A positive bias voltage of about 0.8 V generated by a substrate bias voltage generation circuit VG is supplied to this well region P-WELL 1, though this arrangement is not particularly limited to this.

Switch MOSFETs Q13~Q15, which connect the signal lines of the pixel array to the output signal lines, in order to reduce the random noise, in other words, to reduce the parasitic capacitances of the signal lines and output signal lines are formed in another independent well region, though this arrangement is not particularly limited to this. A relatively large negative back-bias voltage such as about −4 to −6 V is supplied from the substrate bias generation circuit to the well region in which these switch MOSFETs are formed.

A horizontal shift register HSR generates selection signals of the horizontal scanning lines H1, H2, etc., of the pixel array. A vertical shift register VSR generates selection signals of the vertical scanning lines V1, V2, V3, etc. of the pixel array.

Figure 6:
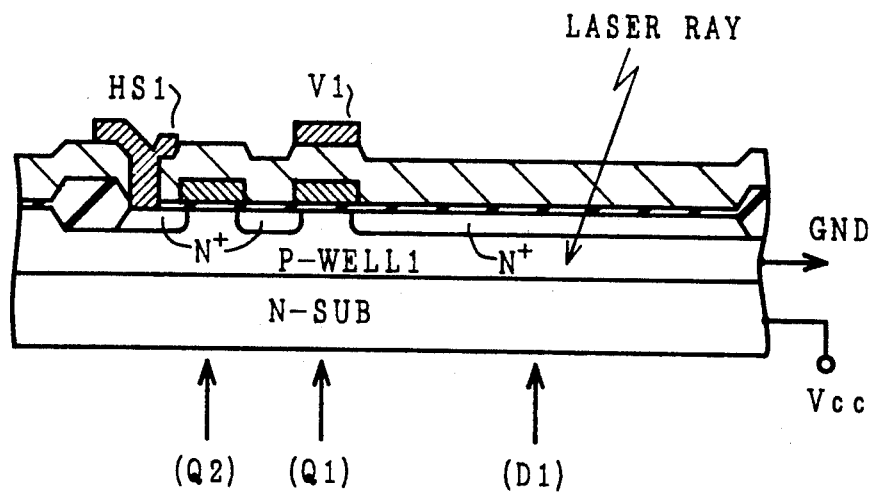
FIG. 6 is a schematic sectional view of a device, showing an example of its pixel (picture cell).

FIG. 6 is a schematic sectional view of a device, showing an example of one picture cell described above.

A P-type well region P-WELL is formed on the surface of an N-type semiconductor substrate N-SUB. The power source voltage Vcc is supplied to the N-type semiconductor substrate N-SUB described above. The positive bias voltage described above is supplied to the well region P-WELL 1 so as to absorb the false signal occurring in the well region P-WELL 1. An N+-type semiconductor region which constitutes the switch MOSFETs Q1, Q2 and the photo-diode D1 is formed in the well region P-WELL 1. The N+ region constituting the switch MOSFET Q2 is connected to a wiring that constitutes the signal line HS1. A wiring that constitutes the vertical scanning line V1 is formed on the gate electrode forming the switch MOSFET Q1 through an insulating film, though this arrangement is not particularly limited to this.

A high energy beam represented typically by a laser beam is irradiated to the photo-diode corresponding to the defective pixel or to the photo-diode for recording the afore-mentioned discrimination signal, in order to destroy the P-N junction in the same way as described before.

The read operation of such a photo-diode is distinguished from the read operation of the normal picture signal of about 0.8 V positive bias voltage and is outputted through the sense amplifier. Incidentally, when the ground potential (0 V) of the circuit is applied to the well region forming the pixel array described above, such a 0 V signal is read out as the fault picture signal or the mark signal. Accordingly, there is disposed a circuit for replacing the defective pixel signal or the mark signal with the preceding picture signal or with the picture signal of the preceding row by use of the comparator and the sample-and-hold circuits shown in FIG. 1 or by use of the 1H delay line and the switch devices shown in FIG. 3.

When the signal of the photo-diode whose P-N junction has thus been destroyed is recorded as the mark signal, a counter circuit and a decoder circuit are disposed so as to generate the address signal which corresponds to the mark signal.

The defect relieving signal may be fixed to an inconspicuous intermediate level or black level in place of the preceding pixel signal or the pixel signal of the preceding row. This also holds true of the imaging apparatus shown in FIGS. 1 or 3.

The function and effect obtained from the embodiment described above is as follows.

(1) A high energy beam such as a laser beam is irradiated to the photo-diode of the defective pixel cell so as to destroy its P-N junction and to output a signal having a different level from those of the ordinary read signals. Accordingly, it is possible to obtain the effect that the defective pixel information appearing in the output signal is detected by the voltage detection circuit and the defective pixel can be relieved by use of the circuit for forming the preceding pixel signal or the pixel signal of the preceding row.

(2) Since the defective pixel information is recorded in the solid state imaging device itself as described above, the shipment of a pair of external storages storing the information corresponding on the one-to-one basis to each of the solid state imaging device as has been necessary in the conventional defect relief and the troublesome management during the assembly process of the imaging apparatus can be eliminated and at the same time, the inspection at the time of shipment of the solid state imaging device and the acceptance inspection on the customer side can be simplified.

(3) A high energy beam such as a laser beam is irradiated to the photo-diode of the pixel cell corresponding to the specific address so as to destroy the P-N junction and to output the signal having a different level from that of the ordinary read signal. Accordingly, the insertion of characters, or the like, can be made easily by utilizing the specific address information appearing in the output signal.

Although the present invention has thus been described in connection with the various disclosed embodiments, the invention is not particularly limited to them but can of course be changed or modified in various ways without departing from the scope thereof. For example, various forms can be employed for the definite structure of the CCD solid state imaging device and the MOS solid state imaging device. A variable sensitivity function (electronic shutter) and the like may be added to the imaging apparatus by adding a circuit for sweeping out the unnecessary charges. The imaging apparatus may include color filters on the surface of the photo-diodes for obtaining color images and circuits for separating and outputting the color signals. Furthermore, the solid state imaging device may be equipped with a built-in comparator for detecting the defective pixel signal and may also be equipped with sample-and-hold circuits and a 1H delay circuit as shown in FIGS. 1 and 3 in addition to the comparator inside it.

The present invention can be utilized widely for solid state imaging devices.

The effect obtained from the typical invention among those disclosed in this application is briefly as follows. A high energy beam such as a laser beam is irradiated to a photo-diode of a defective pixel cell so as to destroy the P-N junction and to output a signal having a different level from those of ordinary read signals. Accordingly, the defective pixel information appearing in the output signal is detected by a voltage detection circuit and the relief of the defective pixels can be made by use of a circuit which forms the preceding picture signal or the picture signal of the preceding row. The defective pixel signal can also be utilized as a specific mark representing the display position.

What is claimed is:

1. A solid state imaging device comprising:
   a plurality of picture cells including photo-diodes, each of which being formed by a P-N junction;
   wherein said plurality of picture cells are arranged in the form of a matrix array; and
   wherein the P-N junction of a photo-diode corresponding to a defective picture cell or a picture cell corresponding to a specific address is destroyed by the irradiation of a high energy beam.

2. A solid state imaging device according to claim 1, further comprising:
   a voltage detection circuit for receiving a read signal from said photo-diode;
   a first sample-and-hold circuit for receiving the read signal from said photo-diode;
   a second sample-and-hold circuit for receiving the output signal of said first sample-and-hold circuit; and
   a control circuit for controlling the operation of said first and second sample-and-hold circuits.

3. A solid state imaging device according to claim 2, wherein when the read signal from said photo-diode whose P-N junction is destroyed is detected by the output signal of said voltage detection circuit, said control circuit inhibits the sampling of the input signal of said first sample-and-hold circuit so that a preceding picture cell signal is outputted in place of the read signal from said photo-diode whose P-N junction is destroyed.

4. A solid state imaging device according to claim 1, further comprising:
   a plurality of vertical charge coupled devices for transferring a signal of the photo-diodes; and a horizontal charge coupled device for transferring a signal therethrough which is received from said plurality of vertical charge coupled devices.

5. A solid state imaging device according to claim 1, further comprising:
   a plurality of pairs of switching transistors, each pair thereof being electrically coupled to a respective one of the photo-diodes;
   a horizontal shift register means being coupled to control one of the switching transistors of each pair of switching transistors; and
   a vertical shift register means being coupled to control the other switching transistor of each pair of switching transistors,
   wherein each pair of switching transistors is series-coupled together with a corresponding photo-diode.

6. A solid state imaging device according to claim 1, further comprising:
   a plurality of pairs of switching transistors, each pair thereof being electrically coupled to a respective one of the photo-diodes;
   a horizontal shift register means being coupled to control one of the switching transistors of each pair of switching transistors; and
   a vertical shift register means being coupled to control the other switching transistor of each pair of switching transistors,
   wherein each pair of switching transistors is series-coupled together with a corresponding photo-diode.

7. An imaging apparatus comprising:
   a solid state imaging device having a plurality of picture cells each including photo-diodes and being formed by a P-N junction, wherein the P-N junction of a photo-diode of a defective picture cell or a picture cell corresponding to a specific address is destroyed by the irradiation of a high energy beam;
   a voltage detection circuit for receiving a read signal from said solid state imaging device and detecting the read signal from said photo-diode whose P-N junction is destroyed;
   a first sample-and-hold circuit for receiving the read signal from said solid state imaging device;
   a second sample-and-hold circuit for receiving the output signal of said first sample-and-hold circuit; and
   a control circuit for controlling the operation of said first and second sample-and-hold circuits;
   wherein when the read signal from said photo-diode whose P-N junction is destroyed is detected by the output signal of said voltage detection circuit, said control circuit inhibits the sampling of the input signal by said first sample-and-hold circuit so that a preceding picture cell signal is outputted in place of the read signal from said photo-diode whose P-N junction is destroyed.

8. A solid state imaging device according to claim 7, further comprising:
   a plurality of vertical charge coupled devices for transferring a signal of the photo-diodes; and
   a horizontal charge coupled device for transferring a signal therethrough which is received from said plurality of vertical charge coupled devices.

9. A solid state imaging device according to claim 7, further comprising:
   a plurality of pairs of switching transistors, each pair thereof being electrically coupled to a respective one of the photo-diodes;
   a horizontal shift register means being coupled to control one of the switching transistors of each pair of switching transistors; and
   a vertical shift register means being coupled to control the other switching transistor of each pair of switching transistors,
   wherein each pair of switching transistors is series-coupled together with a corresponding photo-diode.

10. An imaging apparatus comprising:
   a solid state imaging device having a plurality of picture cells each including photo-diodes and being formed by a P-N junction, wherein the P-N junction of a photo-diode of a defective picture cell or a picture cell corresponding to a specific address is destroyed by the irradiation of a high energy beam;
   a voltage detection circuit for receiving a read signal from said solid state imaging device and detecting the read signal from said photo-diode whose P-N junction is destroyed; and
   a delay circuit for effecting a delay corresponding to one horizontal scanning period receiving the read signal from said solid state imaging device; whereby when the read signal from said photo-diode whose P-N junction is destroyed is detected by the output signal of said voltage detection circuit, the picture signal corresponding to a scanning of one preceding row, delayed by said delay circuit, is outputted in place of the read signal from said photo-diode whose P-N junction is destroyed.

11. A solid state imaging device according to claim 10, further comprising:
   a plurality of vertical charge coupled devices for transferring a signal of the photo-diodes; and
   a horizontal charge coupled device for transferring a signal therethrough which is received from said plurality of vertical charge coupled devices.

* * * * *